US011886392B2

(12) United States Patent
Goodall et al.

(10) Patent No.: US 11,886,392 B2
(45) Date of Patent: Jan. 30, 2024

(54) MANAGING VERSIONS OF OBJECTS RESULTING FROM APPENDING DATA FOR SPACE EFFICIENCY

(71) Applicant: INTERNATIONAL BUSINESS MACHINES CORPORATION, Armonk, NY (US)

(72) Inventors: Lourie Goodall, Tucson, AZ (US); Joseph M. Swingler, Phoenix, AZ (US); Erika Dawson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 17/027,696

(22) Filed: Sep. 21, 2020

(65) Prior Publication Data
US 2022/0092036 A1 Mar. 24, 2022

(51) Int. Cl.
*G06F 16/18* (2019.01)
*G06F 8/71* (2018.01)
(52) U.S. Cl.
CPC ............ *G06F 16/1873* (2019.01); *G06F 8/71* (2013.01)
(58) Field of Classification Search
CPC ......... G06F 16/1873; G06F 8/71; G06F 16/18
USPC ........................................................ 707/638
See application file for complete search history.

(56) References Cited

U.S. PATENT DOCUMENTS

| 10,152,492 | B1 * | 12/2018 | Abdulla .............. G06F 16/1873 |
| 2014/0181395 | A1 | 6/2014 | Vincent et al. |
| 2016/0110403 | A1 * | 4/2016 | Lomet ................. G06F 16/2255 |
| | | | 707/695 |
| 2017/0153833 | A1 | 6/2017 | Iwasaki et al. |
| 2020/0042607 | A1 | 2/2020 | Mitsuma et al. |

OTHER PUBLICATIONS

L. Coyne, et al., "IBM TS7700 Release 5.0 Guide", IBM Corporation, Document No. SG24-8464-00, Mar. 2020, pp. 984.

\* cited by examiner

*Primary Examiner* — Hosain T Alam
*Assistant Examiner* — Tracy M McGhee
(74) *Attorney, Agent, or Firm* — David Victor; Konrad Raynes Davda & Victor LLP

(57) ABSTRACT

Provided are a computer program product, system and method for retaining versions of an object. Changes are appended to a current version object resulting in a new current version object and a most recent previous version object comprising the current version object before the changes were appended. Version metadata, for each previous version object, includes the most recent previous version object, indicating an offset in the new current version object at which the previous version object can be recovered. The most recent previous version object is deleted and the version metadata, for the most recent previous version object after the most recent previous version object is deleted, is retained to allow recovery of a previous version object from the new current version object using the offset in the version metadata.

25 Claims, 12 Drawing Sheets

| Day | Volser | Ver | Day Expires | Actual_data | Size | Version Offset |
|---|---|---|---|---|---|---|
| 1 | L00000 | v1 | 10 | in v7 | 3200000000 | -50000000 |
| 2 | L00000 | v2 | 11 | in v7 | 3250000000 | -100000000 |
| 3 | L00000 | v3 | 12 | in v7 | 3350000000 | -100000 |
| 4 | L00000 | v4 | 13 | in v7 | 3350100000 | -50000000 |
| 5 | L00000 | v5 | 14 | in v7 | 3400100000 | -100000000 |
| 6 | L00000 | v6 | 15 | in v7 | 3500100000 | -100000000 |
| 7 | L00000 | v7 | NA | v7 | 3600100000 | NA |

Version Meta Data and Data on Day 7 — 702

'x' days version retention = 7
'n' number of data version to keep = 1

FIG. 7B

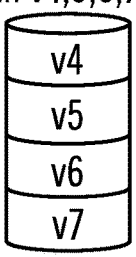

| | | | Version Meta Data and Data on Day 7 | | | |
|---|---|---|---|---|---|---|
| Day | Volser | Ver | Day Expires | Actual_data | Size | Version Offset |
| 1 | L00000 | v1 | 10  1 | in v4,5,6,7 | 3200000000 | -50000000 |
| 2 | L00000 | v2 | 11 | in v4,5,6,7 | 3250000000 | -100000000 |
| 3 | L00000 | v3 | 12 | in v4,5,6,7 | 3350000000 | -100000 |
| 4 | L00000 | v4 | 13 | v4 | 3350100000 | -50000000 |
| 5 | L00000 | v5 | 14 | v5 | 3400100000 | -100000000 |
| 6 | L00000 | v6 | 15 | v6 | 3500100000 | -100000000 |
| 7 | L00000 | v7 | NA | v7 | 3600100000 | NA |

'x' days version retention = 7
'n' number of data version to keep = 3

FIG. 7C

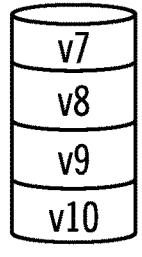

| | | | Version Meta Data and Data on Day 10 | | | |
|---|---|---|---|---|---|---|
| Day | Volser | Ver | Day Expires | Actual_data | Size | Version Offset |
| 2 | L00000 | v2 | 11 | in v7,8,9,10 | 3250000000 | -100000000 |
| 3 | L00000 | v3 | 12 | in v7,8,9,10 | 3350000000 | -100000 |
| 4 | L00000 | v4 | 13 | in v7,8,9,10 | 3350100000 | -50000000 |
| 5 | L00000 | v5 | 14 | in v7,8,9,10 | 3400100000 | -100000000 |
| 6 | L00000 | v6 | 15 | in v7,8,9,10 | 3500100000 | -100000000 |
| 7 | L00000 | v7 | 16 | v7 | 3600100000 | -100000000 |
| 8 | L00000 | v8 | 17 | v8 | 3700100000 | -100000000 |
| 9 | L00000 | v9 | 18 | v9 | 3800100000 | -100000000 |
| 10 | L00000 | v10 | 19 | v10 | 3900100000 | NA |

'x' days version retention = 7
'n' number of data version to keep = 3

FIG. 10A — Disk Append Scenario - Data Retention

| Day | Host Operation | | Storage |
|---|---|---|---|
| 1. | Initial write L00000 | v1 | Keep until next version written + data retention expires |
| 2. | Append v2 | v2 | Keep until next version written - start v1 data retention timer & keep VDM |
| 3. | Append v3 | v3 | Keep until next version written - delete v2 data but keep VDM |
| 4. | Append v4 | v4 | Keep until next version written + data retention expires - delete v3 data keep VDM |
| 5. | Append v5 | v5 | Keep until next version written - start v4 retention timer & keep VDM |
| 6. | Append v6 | v6 | Keep until next version written - delete v5 data but keep VDM |
| 7. | Append v7 | v7 | Keep until next version written + data retention expires - delete v6 data keep VDM |
| 8. | Append v8 | v8 | Keep until next version written - start v7 data retention timer & keep VDM |
| 9. | - | | Day 9, v1 exceeds version retention timer and is deleted |

Property: Keep every 3rd version
Property: Retain Version for 7 days

FIG. 10B — Storage System as of Day 9

Version Meta Data

| Volser | Ver | Days_til_Expire | Actual_data | Size | Version Offset |
|---|---|---|---|---|---|
| L00000 | v2 | 1 | in v4 | 10000000000 | -1000000000 |
| L00000 | v3 | 2 | in v4 | 11000000000 | -1000000000 |
| L00000 | v4 | 3 | v4 | 12000000000 | -1000000000 |
| L00000 | v5 | 4 | in v7 | 13000000000 | -1000000000 |
| L00000 | v6 | 5 | in v7 | 14000000000 | -1000000000 |
| L00000 | v7 | 6 | v7 | 15000000000 | -1000000000 |
| L00000 | v8 | NA | v8 | 16000000000 | NA |

Property: Keep every 3rd version
Property: Retain Version for 7 days

| Cloud Pool Policies | | |
|---|---|---|
| Cloud_Pool_Name | version_retention_days | max_version_to_keep |
| CLDPOOL1 | 3 | - |
| CLDPOOL2 | 0 | - |
| CLDPOOL3 | 30 | 3 |
| CLDPOOL4 | forever | - |

FIG. 11

| Scratch Mount - Multi Pool Assignment Example | | | | | | |
|---|---|---|---|---|---|---|
| Day | VOLSER | Ver | CLDPOOL | Day_Will_Expire | Actual_data | Comments |
| 1 | L99999 | v1 | CLDPOOL1 | 6 | v1 | First version |
| 2 | L99999 | v2 | CLDPOOL1 | 7 | v2 | v1 retention starts |
| 3 | L99999 | v3 | CLDPOOL4 | ∞ | v3 | v2 retention starts |
| 4 | L99999 | v4 | CLDPOOL3 | 36 | v4 | v3 retention starts but never expire |
| 5 | L99999 | v5 | CLDPOOL1 | 10 | v5 | v4 retention starts |
| 6 | L99999 | v6 | CLDPOOL2 | 0 | v6 | v5 retention starts, v1 deleted |
| 7 | L99999 | v7 | CLDPOOL4 | ∞ | v7 | v6 deleted, v2 deleted |
| 8 | L99999 | v8 | CLDPOOL1 | 13 | v8 | v7 retention starts but never expire |
| 9 | L99999 | v9 | CLDPOOL3 | 41 | v9 | v8 retention starts |
| 10 | L99999 | v10 | CLDPOOL3 | 42 | v10 | v9 retention starts, v5 deleted |
| 11 | L99999 | v11 | CLDPOOL3 | 43 | v11 | v10 retention starts |
| 12 | L99999 | v12 | CLDPOOL3 | - | v12 | v11 retention starts |

Data is written, deleted, expired each day then picked up as scratch the next day

```
              By Cloud Pool Policies - Day 5
CLDPOOL1 (days=3 max=NA)
    VOLSER          Ver     Day_Expires
    L99999          v1      6
    L99999          v2      7
    L99999          v5      NA   ← current active data CLDPOOL2 (days=0 max=NA)
    <empty>

CLDPOOL3 (days=30 max=3)
    VOLSER          Ver     Day_Expires
    L99999          v4      36

CLDPOOL4 (days=∞ max=NA)
    VOLSER          Ver     Day_Expires
    L99999          v3      never
```

FIG. 14

```
              By Cloud Pool Policies - Day 12
CLDPOOL1 (days=3 max=NA)
    VOLSER          Ver     Day_Expires
    L99999          v8      13

CLDPOOL2 (days=0 max=NA)
    <empty>

CLDPOOL3 (days=30 max=3)
    VOLSER          Ver     Day_Expires
    L99999          v4      36   ← removed early due to max 3 copies
    L99999          v9      41
    L99999          v10     42
    L99999          v11     43
    L99999          v12     NA   ← current active data CLDPOOL4 (days=∞ max=NA)
    VOLSER          Ver     Day_Expires
    L99999          v3      never
    L99999          v7      never
```

MANAGING VERSIONS OF OBJECTS RESULTING FROM APPENDING DATA FOR SPACE EFFICIENCY

BACKGROUND

The present disclosure relates to a computer program product, system, and method for managing versions of objects resulting from appending data for space efficiency.

Mainframe hosts and storage controllers communicate with long-term storage devices using tape protocols. In virtual tape, Virtual Tape Servers (VTS) emulate tape devices. The International Business Machines Corporation's TS7700 is one such VTS that emulates a tape library with tape drives. A mainframe host views the TS7700 as a tape library.

Tape libraries contain a range of empty tapes that are ready to store data. These tapes are assigned an ID called a VOLSER (volume serial number). A mainframe host catalogs these tapes by their VOLSER to know which tape VOLSERs are available and which tape VOLSERs contain data and the content of that data. This way, when a particular data set is needed, the mainframe knows which VOLSER to request from the tape library.

The tape library also catalogs and manages these tapes by their VOLSER. The tape library does not know the content of a VOLSER but keeps track of where in the tape library the VOLSER is stored and how it should manage the VOLSER (e.g. how long to retain it after the VOLSER is deleted, how many copies to maintain and where to store those copies, etc.). A VTS emulating a tape library operates in a similar manner but manages virtual tape volumes.

A single tape cartridge (VOLSER) can store a large amount of data so the host typically bundles a large amount of data together before writing to the tape. A VOLSER can contain multiple data sets (potentially thousands of data sets). At some point, data can become obsolete and no longer relevant. For instance, a data set could be a backup of a mainframe database that is taken daily. A mainframe user may retain old backups for a week before deleting them.

In certain configurations, these VOLSER items can be copied or moved to a tier of additional storage, such as physical tape, cloud object store, optics or similar. Therefore, each append could result in an entire new instance of the VOLSER being copied to another tier versus just the delta which was appended. In certain configurations, each unique version prior to an append may be required to be a recovery point and therefore must be retained further increasing the demand for capacity and version management.

There is a need in the art for improved techniques for managing data for versions of objects that is both space efficient and allows recovery of the object versions in the event of a disaster or data loss.

SUMMARY

Provided are a computer program product, system and method for retaining versions of an object. Changes are appended to a current version object resulting in a new current version object and a most recent previous version object comprising the current version object before the changes were appended. Version metadata, for each previous version object, includes the most recent previous version object, indicating an offset in the new current version object at which the previous version object can be recovered. The most recent previous version object is deleted and the version metadata, for the most recent previous version object after the most recent previous version object is deleted, is retained to allow recovery of a previous version object from the new current version object using the offset in the version metadata.

With the above embodiment, available space is optimized by deleting a most recent previous version object. Version metadata for a deleted previous version object is retained to allow recovery of the previous version object from the new current version object. In this way, space efficiency is increased by deleting previous version objects and at the same time data recovery of deleted previous version objects is available through the saved version metadata, which uses substantially less space than the deleted previous version object.

In a further embodiment, a retention policy is applied to determine a condition under which to remove an oldest previous version of previous version objects. Version metadata is deleted for the oldest previous version in response to determining that condition indicates to remove the oldest previous version. An oldest previous version object is deleted in response to determining that the condition indicates to remove the oldest previous version and the oldest previous version object is retained for the oldest previous version.

With the above embodiment, retention policies are used to delete version metadata for an oldest previous version even if the oldest previous version object was deleted to limit the amount of space used by version metadata. Further, the retention policy deletes the oldest previous version object if still retained to increase available space and limit the number of full version objects maintained.

In a further embodiment, in response to appending changes to the current version object resulting in the new current version object, a determination is made whether an export queue indicates a previous version object. The previous version object indicated in the export queue is replaced with the most recent previous version object to cause the most recent previous version object to be exported to a remote storage.

With the above embodiment, if changes to the current version object to create a new current version object are occurring at a rate faster than previous version objects can be exported, then the previous version object in the export queue is replaced with the most recently changed previous version object so that the most recent previous version of the object is exported. This retains the object at its current position in the queue to ensure that a most recent version of the object is exported but only retains one version of the object in the export queue to avoid too many versions of an object in the queue from delaying exporting of other objects being exported.

In a further embodiment, the current version object before being appended includes trailing metadata at an end of the current version object added by a system that provided data for the current version object. The trailing metadata in the current version object is marked as hidden. The appending the changes comprises appending the changes after the hidden trailing metadata to retain the hidden trailing metadata in the previous version object to use to recover the previous version object.

With the above embodiment, trailing metadata is marked as hidden so it will be skipped and not overwritten when appending changes at an end of the current version object. Retaining the trailing metadata as hidden allows the trailing metadata to be recovered when recovering the previous version object so that the trailing metadata can be added back to the end of the previous version object to return the previous version object to its state before the changes were appended.

Further are a computer program product, system and method for retaining versions of an object. Changes are appended to a current version object resulting in a new current version object and a most recent previous version object comprising the current version object before the changes were appended. Version metadata for the most recent previous version indicates an offset at which the most recent previous version object is located in the new current version object and includes trailing metadata at the end of the current version object before the changes were appended. The most recent previous version object is deleted after appending the changes to the current version. The version metadata, for the most recent previous version object after the most recent previous version object is deleted, is retained. The offset and the trailing metadata in the version metadata are used to recover a previous version object from the new current version object.

With the above embodiment, a most recent previous version object that was modified by appended changes to produce a new current version object is deleted to increase space available in the system. The version metadata is provided to allow recovery of the most recent previous version object from the new current version object using the offset saved in the version metadata. Further, trailing metadata is also saved in the version metadata to use to recover the most previous version object because trailing metadata may be overwritten when appending the changes to the current version object. In this way, space is conserved by deleting a most previous version object and saving metadata necessary to recover a previous version object from the new current version object, including the trailing metadata, which cannot be recovered from the new current version object because it was overwritten when appending the changes. This allows full recovery of the most recent previous version object with its trailing metadata.

BRIEF DESCRIPTION OF THE DRAWINGS

FIGS. 6a, 6b, and 6c illustrate an embodiment of operations to apply retention policies to determine version metadata and version objects to delete.

FIG. 7a, 7b, 7c illustrates an example of applying retention policies comprising a number of days to store a version and a number of data versions to retain when appending data to a volume.

FIGS. 10a and 10b illustrate an example of applying retention policies comprising retain every $3^{rd}$ version and to retain versions for 7 days when appending data to a volume.

FIG. 11 illustrates an example of policy pools having different retention policies.

FIG. 12 illustrates an example of how version objects are assigned to policy pools.

FIG. 13 illustrates an example of the status of object versions in different policy pools of FIGS. 11 and 12 on day five of creating object versions.

FIG. 14 illustrates an example of the status of object versions in different policy pools of FIGS. 11 and 12 on day twelve of creating object versions.

DETAILED DESCRIPTION

Figure 1:
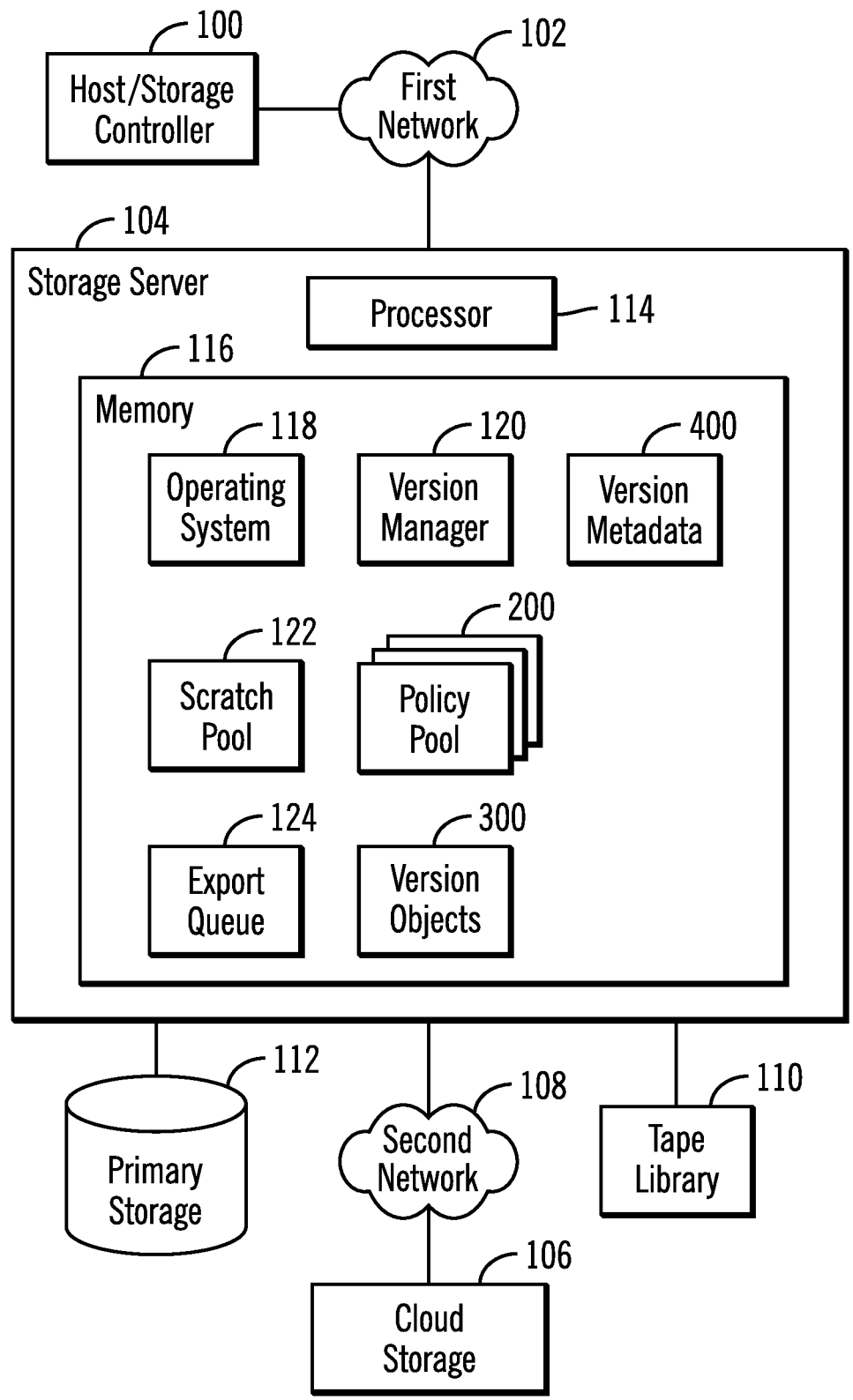
FIG. 1 illustrates an embodiment of a storage environment.

When a data set is no longer needed, a RECLAIM operation is performed to rewrite the tape cartridge. Reclaiming space in a tape volume consumes system resources in both the mainframe host and the storage device. Reclaims are also used to free space in the tape library or VTS. Even though the host deletes a data set in their catalog, it does not mean a portion of the VOLSER stored in the library is also deleted. If a VOLSER has an original size of 20 GB but 80% of the data sets have been deleted at the host, that VOLSER still consumes 20 GB of space in library storage space. It is only through the reclaim process that space is freed up.

A host user will dictate at what percentage of valid data on a VOLSER to begin the reclaim process. At this point the mainframe host will recall the VOLSER, move the valid data into another VOLSER with other valid data and return the VOLSER back to an empty state.

A virtual tape server, such as the TS7700, may also retain the VOLSER for a time period specified by a host user even after the mainframe host has reclaimed the active data and marked the VOLSER as deleted. This practice is used in case of accidental or malicious activity where someone marks the VOLSER for delete in the host prematurely. In a TS7700, this is called Category Retention. A user can set a retention period from hours to years on any volume with data. However, the data contained in the VOLSER will eventually be deleted. Once that happens, the virtual tape system will delete all copies of the data on its systems and the data is no longer accessible. Alternatively, the virtual tape server may remove some subset of the redundant copies as time passes as the redundancy requirements ease with the VOLSER's age.

In tape volumes, new data may be appended to an existing current tape volume to create a new version of the tape volume. In this scenario, the same VOLSER continues to be used but the version changes due to the modification to the volume where data is added to the end. In some instances, data could be appended to a volume hundreds of times a day and even in a single mount of the volume, changing the version of the data each time. This requires managing versions of each volume since there could be hundreds of versions every day.

Described embodiments provide improvements to computer technology for managing versions of an object that do not store data for every version of an append volume and allow the ability to recover versions for which object data is not stored. These embodiments significantly reduce the amount of space taken up by the versions while still providing a mechanism to restore any incremental version of the data. This will alleviate the dilemma of having to choose between retaining an adequate number of versions to handle any disaster scenario or reduce the number of recoverable versions to retain to conserve space, which may result in less recovery coverage.

Described embodiments allow the management of object versions according to user specified retention policies to not retain all versions of an appended object, e.g., volume, to save space but still allow the ability to recover every possible version Further, described embodiments discard older versions that exceed rules set in the retention policy to further provide space efficiency.

FIG. 1 illustrates an embodiment of a storage environment having one or more host systems and/or storage controllers 100 that provide data for an object or volume in the form of a reclaim volume or an append to an object over a first network 102 to a storage server 104. An "object" as that term is used herein may comprise a volume, a data set, database, logical drive, file system and any other grouping of data. The storage server 104 may generate objects, such as backup volumes or tape volumes, to backup in one or more of a cloud storage 106 over a second network 108 (which can be on-site or off-site with respect to the storage server 104), a tape library 110 to store on physical tape cartridges, and on primary storage 112 of the storage server 104. Further, the version backup objects may be stored in the primary storage 112 permanently or temporarily as well as transferred to cloud or tape storage. The storage server 104 may generate version objects 300 of backup objects for different versions that have a unique serial number, such as a VOLSER, and includes standard tape marks and data blocks.

The storage server 104 includes a processor 114 and a memory 116 including programs executed by the processor 114 to create version objects 300 of an object in a format, such as a tape format, to store in a tape library 110, cloud storage 106 or primary storage. The memory 116 includes an operating system 118 to manage storage server 104 operations and a version manager 120 to create and manage object versions 300, such as tape volumes, to store in the tape library 110, cloud storage 106 or primary storage 112. The storage server 104 may obtain a serial number from a scratch pool 122, such as a volume serial number (VOLSER), to use for an object version 300 to create and store in the cloud storage 106, tape library 110 or primary storage. All versions of an object/volume would use the same serial number or VOLSER. A tape volume serial number or VOLSER is used to uniquely identify a tape volume. For tape storage, the VOLSER is specified in the tape label, which is the first set of information contained on the tape.

The version manager 120 may further generate version metadata 400 having metadata on the version objects 300 that may be used to restore the data for a version object 300 from version objects 300 for a higher version number.

The serial number or VOLSER obtained from the scratch pool 122 may be assigned to a policy pool 200, where different policy pools 200 maintain different data retention policies. Upon creating an instance of an object version $300_i$ to write to a backup storage, such as 112, 106 or 110, the version manager 120 may add indication of the object version $300_i$ to an export queue 124 to export the object version $300_i$ to backup storage 110, 106.

In one embodiment, the storage server 104 may comprise a virtual tape server to manage the creation of versions of objects to offload to backup storage 110, 106, such as, by way of example, the International Business Machines Corporations (IBM) TS7700 virtual tape server. A virtual server emulates a tape library with tape drives to the connected hosts/storage controllers 100. The storage server 104 may provide archival of objects for storage in a lower cost physical tape library 110 or cloud storage 106. In further embodiments, the storage server 104 may manage versions of primary data, not just backup data from the host/storage controller 100. In such embodiments, the storage server 104 may function as a storage controller and manage read and write requests from host systems 100.

The program components in the memory 116, including 118, 120, are shown in FIG. 1 as program code loaded into the memory 116 and executed by the processor 114. Alternatively, some or all of the components functions may be implemented in hardware devices, such as in Application Specific Integrated Circuits (ASICs), Field Programmable Gate Array (FPGA) or executed by separate dedicated processors.

The memory 116 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The version manager 120 may export object versions 300 to the cloud storage 106 over a second network 108. The cloud storage 106 may comprise a cloud storage system provided by a cloud storage service provider. Examples of cloud storage 106 service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world). In further embodiments, the cloud storage 106 may be on site of the storage server 104.

The version manager 120 may use the primary storage 112 as a virtual tape cache to store object versions 300 being created and before they are added to the export queue 124 to migrate to a backup storage 106, 110. The object versions 300 on the primary storage 112 may be stored long-term or temporarily after the objects 300 are exported to remote storage. In further embodiments, the primary storage 112 may be used to store the object versions 300 if there is no available backup storage 106, 110. Yet further, object versions 300 migrated to backup storage 106, 110 may remain on the primary storage 112 until space is needed on the primary storage 112 at which point the object versions would be removed from the primary storage 112 to free space.

The primary storage 112 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in the primary storage 112 may further be configured from an array of devices, such as Just a Bunch of Disks (JBOD), Direct Access Storage Device (DASD), Redundant Array of Independent Disks (RAID) array, virtualization device, etc. Further, the storage 112 may comprise heterogeneous storage devices from different vendors and different types of storage devices, such as a first type of storage devices, e.g., hard disk drives, that have a slower data transfer rate than a second type of storage devices, e.g., SSDs.

The first network 102 used by a host/storage controller 100 to communicate volume data to storage server 104 may comprise a storage network such as one or more interconnected Local Area Networks (LAN), Storage Area Networks (SAN), Wide Area Network (WAN), peer-to-peer network, wireless network, etc. The second network 108 may comprise a network accessible to a cloud storage 106, such as the Internet, a Wide Area Network (WAN). In alternative embodiments, the first 102 and second 108 networks may be the same network.

Figure 2:
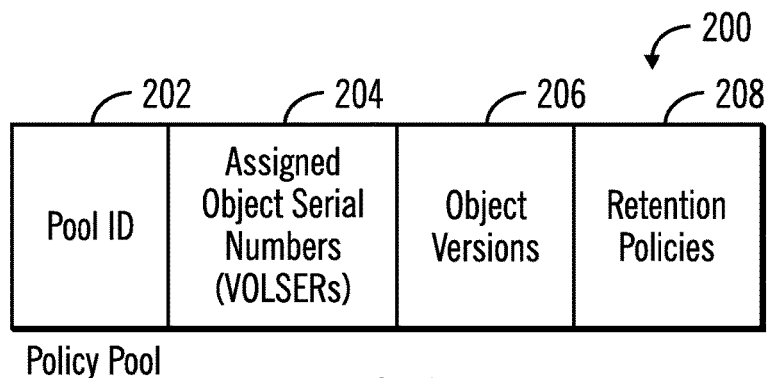
FIG. 2 illustrates an embodiment of a policy pool defining retention polices.

FIG. 2 illustrates an embodiment of a an instance $200i$ of a policy pool 200 to which an object serial number, e.g., VOLSER, is assigned for an object or volume to write, and includes a pool identifier 202 identifying the pool, the assigned object serial numbers (VOLSERs) 204 assigned to the pool, the object versions 206 included in the pool for the object serial numbers 204, and one or more retention policies 208 to determine how long to retain object versions in a policy pool 200.

Examples of retention policies include:
- a maximum number of previous versions to retain, including version metadata $400_i$ and version object $300_i$ data for a version.
- a maximum number of days to retain previous version information, including version metadata $400_i$ and version object $300_i$ data for an object.
- a maximum number of previous versions for which version object $300_i$ data is retained.
- a retain every kth version of an object, such that data for a version object $300_i$ is retained if a version number of the version object $300_i$ is a multiple of k plus 1, e.g., is the version number of the object=1+x*k, where x is an integer greater than zero.

Figure 3:
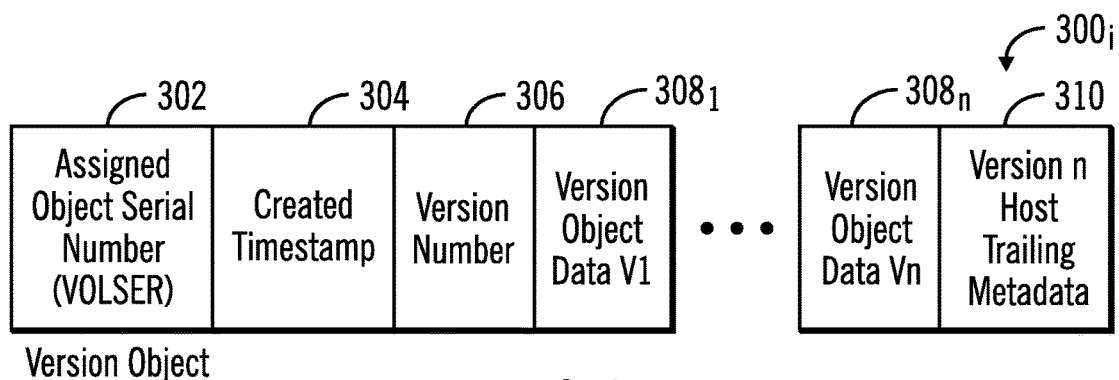
FIG. 3 illustrates an embodiment of a version object having actual data for a version of an object.

FIG. 3 illustrates an instance $300_i$ of a version object being created from object or volume data sent from the hosts/storage controllers 100, and includes: an object serial number, e.g., VOLSER, assigned to the object/volume for which versions are created; a created timestamp 304 when the object version was created; a version number 306 of the object; one or more instances of object version data $308_1 \ldots 308_n$ for each version of object data for versions $V_1$ to $V_n$ from the host/storage controller 100 included to the version object $300_i$, including recently appended data; and host trailing metadata 310 added to the end of an object version by the host/storage controller 100 that created the object version sent to the storage server 104. The host trailing metadata 310 may include information on the structure and format of the object and on the host/storage controller 100 that generated the data in the object.

Figure 4:
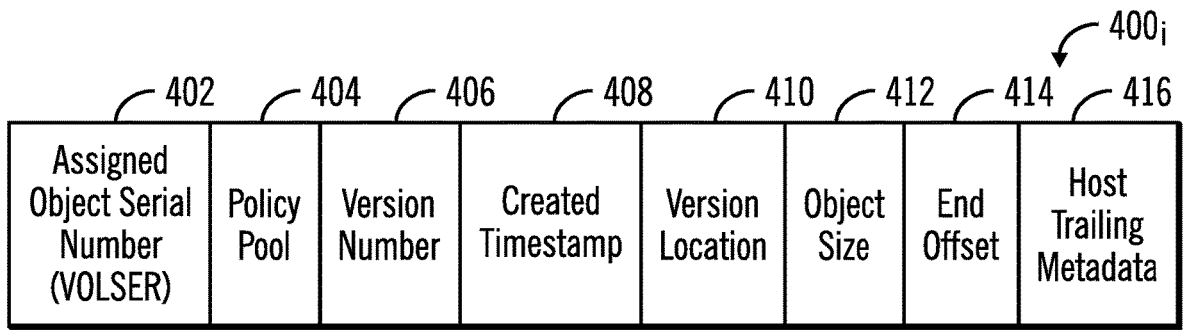
FIG. 4 illustrates an embodiment of version metadata having metadata on a version object.

FIG. 4 illustrate an instance $400_i$ of version metadata 400 having metadata on a version object $300_i$, which may be maintained separate from the version object $300_i$ and be retained if the version object $300_i$ for a prior version is deleted to conserve space. The version metadata $400_i$ instance may include an assigned object serial number, e.g., VOL SER, 402; a policy pool 404 in which the object and serial number 402 are assigned; a version number 406 of the version object; a created timestamp 408 when the version object $300_i$ was created; a version location 410 indicating one or more version objects $300_j$ of a higher version that include the data for the version number 406; an object size 412 of the object $300_i$ represented by the version metadata $400_i$; an end offset 414 indicating where the version object ends if the data for the version object is included in a subsequent version object $300_j$ at which the appended data for the version number 406 ends; and host trailing metadata 416 having information added by the host/storage controller 100 providing the object data and that is located at an end of the version object $300_i$. The host trailing metadata 310 is saved in the version metadata $400_i$ as 416 because the host trailing metadata 310 for version number 406 may be overwritten when new data and changes are appended. This allows the version object $300_i$ to be restored with its original host trailing metadata 310.

The version metadata $400_i$ maintains any other information needed to identify the start and end of a version of data.

The version manager 120 maintains the version metadata $400_i$ until a retention policy determines an end of a version retention period to expire and delete the version metadata $400_i$ as well as version objects $300_i$ having the actual data for the objects. The version metadata $400_i$ may be used to restore any of the versions identified in the version metadata $400_i$ from a current version or previous version object having a version object having a higher version number.

Figure 5A:
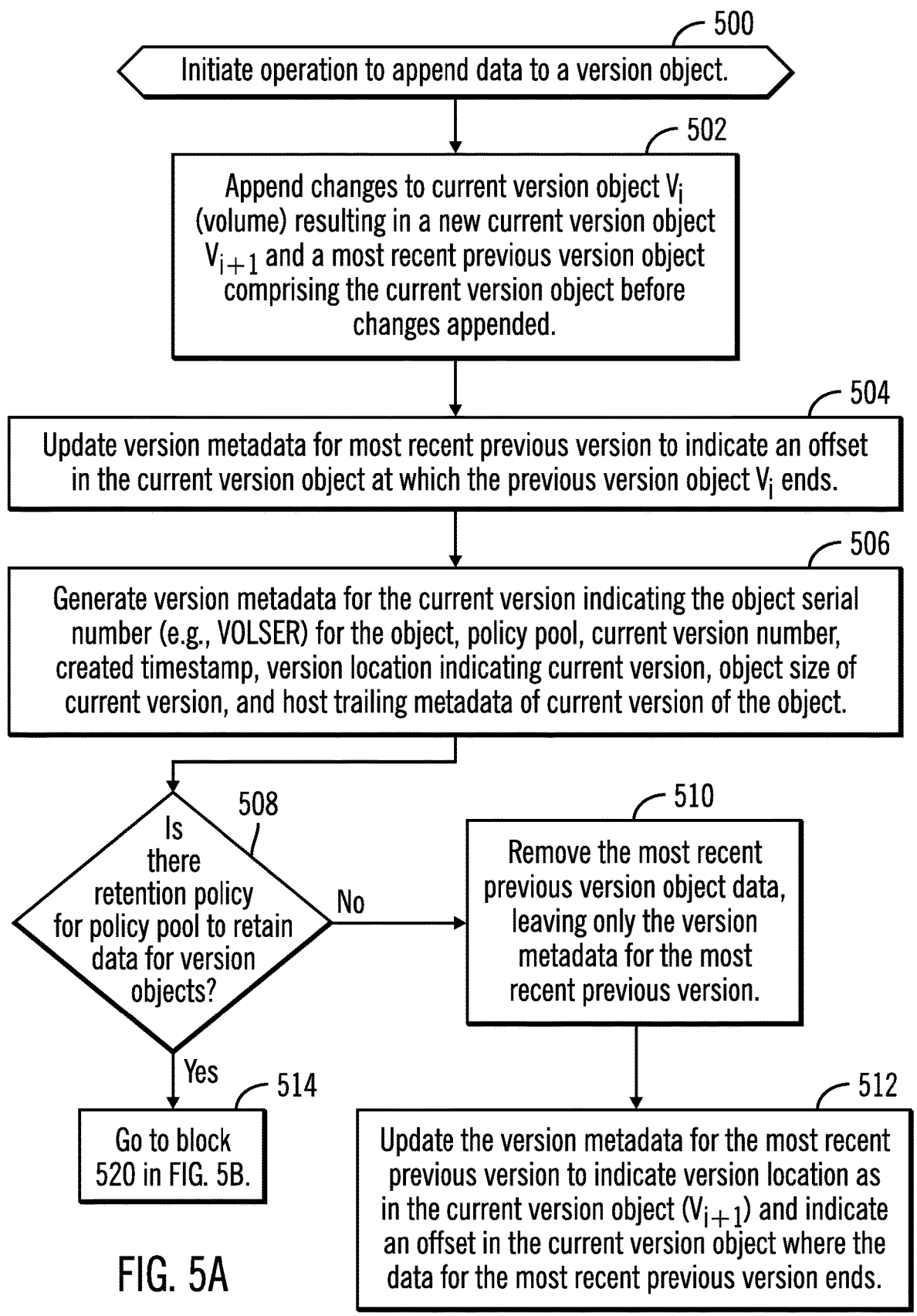
FIGS. 5a and 5b illustrate an embodiment of operations to append data to a version object to result in a new current version object.
Figure 5B:
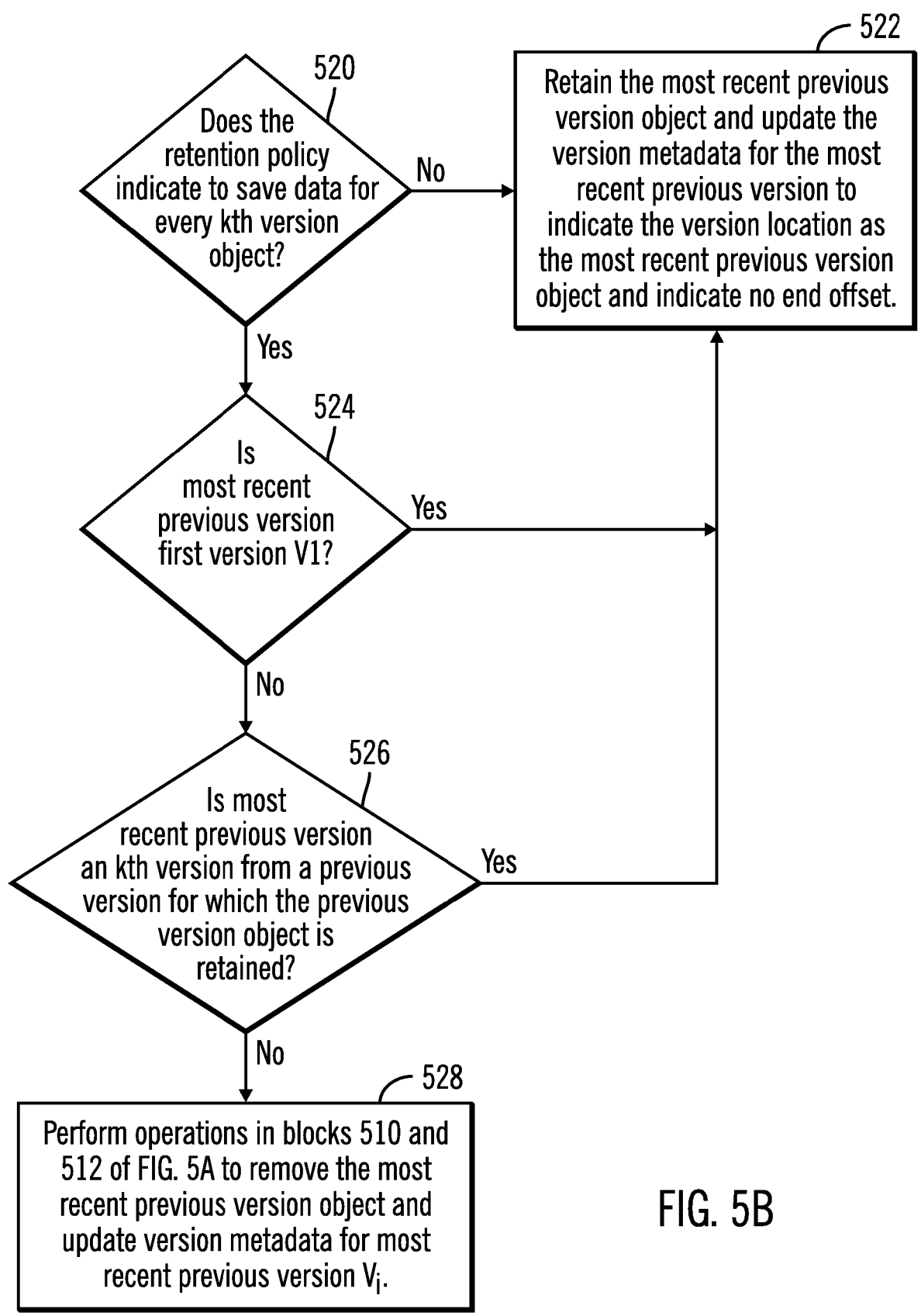

FIGS. 5a and 5b illustrate an embodiment of operations performed by the version manager 120 to append data for an object received from a host/storage controller 100 to create a new version object $300_{i+1}$ for an object or volume. Upon receiving (at block 500) the data to append, the version manager 120 appends (at block 502) received changes to current version object $300_i$ ($V_i$) resulting in a new current version object $300_{i+1}$ ($V_{i+1}$) and a most recent previous version object $300_i$ comprising the current object version $300_i$ before changes were appended. The version metadata $400_i$ for the most recent previous version is updated (at block 504) to indicate an end offset 414 in the current version object $300_{i+1}$ at which the most recent previous version object $300_i$ ends. The version manager 120 generates (at block 507) version metadata $400_{i+1}$ for the current version indicating the object serial number (e.g., VOLSER) 402 for the object, policy pool 404, current version number 406, e.g., i+1, created timestamp 408 of when the object was created; version location 410 indicating current version object $300_{i+1}$; object size 412 of current version, and host trailing metadata 416 of current version of the object from the host trailing metadata 310.

In an alternative embodiment, instead of storing host trailing metadata 412 in the version metadata $400_i$, the version manager 120 may mark the trailing metadata 310 in the version object $300_i$ as hidden before appending the changes, so that the hidden host trailing metadata 412 is not overwritten when appending the changes and is instead retained in the current version object $300_i$ and any retained previous version objects. This hidden host trailing metadata 310 may be used to recover a previous version object from a higher version object because the hidden host trailing metadata 412 remains hidden and not overwritten when appending changes.

If (at block 508) there is no retention policy for the policy pool 404 having the version object $300_{i+1}$, then the data in the version object $300_i$ for the most recent previous version of the object is removed (510), leaving only the version metadata $400_i$ for the most recent previous version. Removing the revision object data saves significant storage space, leaving only the version metadata $400_i$ indicating how the object data for the most recent version may be recovered from the current version object $300_{i+1}$. The version metadata $400_i$ for the most recent previous version is updated (at block 512) to indicate version location 410 as in the current version object $300_{i+1}$ and indicate the end offset 414 in the retained current version object $300_{i+1}$.

If (at block 508) there is a retention policy 208 for the policy pool $200_i$ to which the serial number 302 of the object to retain data for previous object versions, then the version manager determines (at block 520 in FIG. 5*b*) whether the retention policy 208 indicates to save data for every kth version object. If (at block 520) the retention policy does not indicate to save every kth version object, then the version manager 120 retains (at block 522) the most recent previous version object $300_i$ and updates the version metadata $400_i$ for the most recent previous version to indicate the version location 410 as the most recent previous version object $300_i$ and indicate no end offset 414. If (at block 520) there is a retention policy to save every kth version object, then if (at block 524) the most recent previous version comprises a first version, then control proceeds to block 522 to save the most recent previous version object $300_i$. If (at block 524) the most recent previous version is not the first version, then a determination is made (at block 526) whether the most recent previous version i is a kth version from a previous version for which the previous version object is retained or the first version object. This determination may also be made by determining that the most recent previous version i is a multiple of k from the first version, i.e., i=1+x*k, where x is an integer of one or greater. If (at block 524) the most recent previous version i is a kth version from the previously saved version object, then control proceeds to block 522 to retain the most recent previous version object $300_i$. If (at block 526) i is not a multiple of k or a multiple of kth version from the first version, then the version manager 120 performs the operations at blocks 512 and 514 of FIG. 5*a* to remove the most recent previous version object $300_i$ and update the version metadata $400_i$ for the most recent previous version i.

With the embodiment of FIGS. 5*a* and 5*b*, when appending data to a current version object to create a new current version of the object, the most recent previous version object, to which the data is appended, is deleted to save space unless the retention policy indicates to save previous version objects. The administrator may want to maintain multiple previous version objects in case the current version object becomes corrupted, compromised by malicious activity, or unrecoverable due to disk system failures. In this way, the retained multiple previous version objects provide redundancy in case the most current version cannot be accessed. Once the most recent previous version object $300_i$ is removed, it may be recovered using the version metadata $400_i$ for the most recent previous version.

Figure 6A:
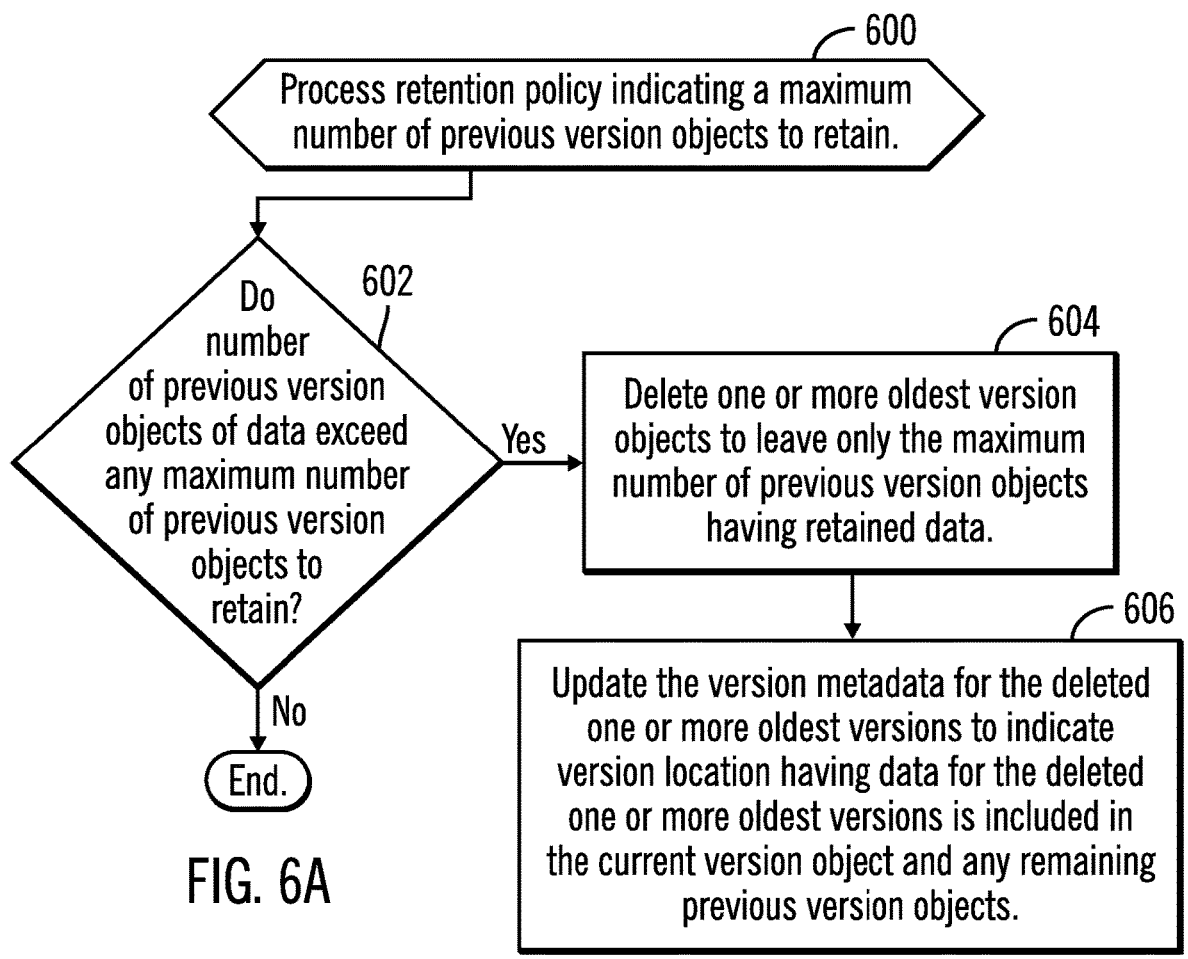
Figure 6B:
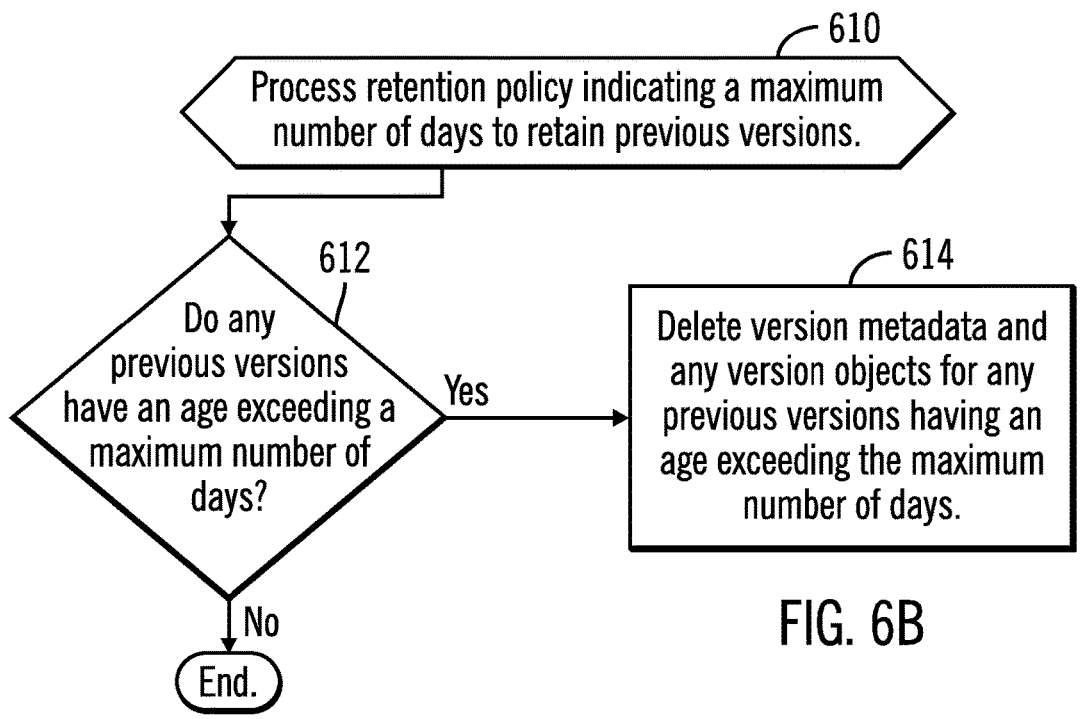
Figures 6C, 7A:
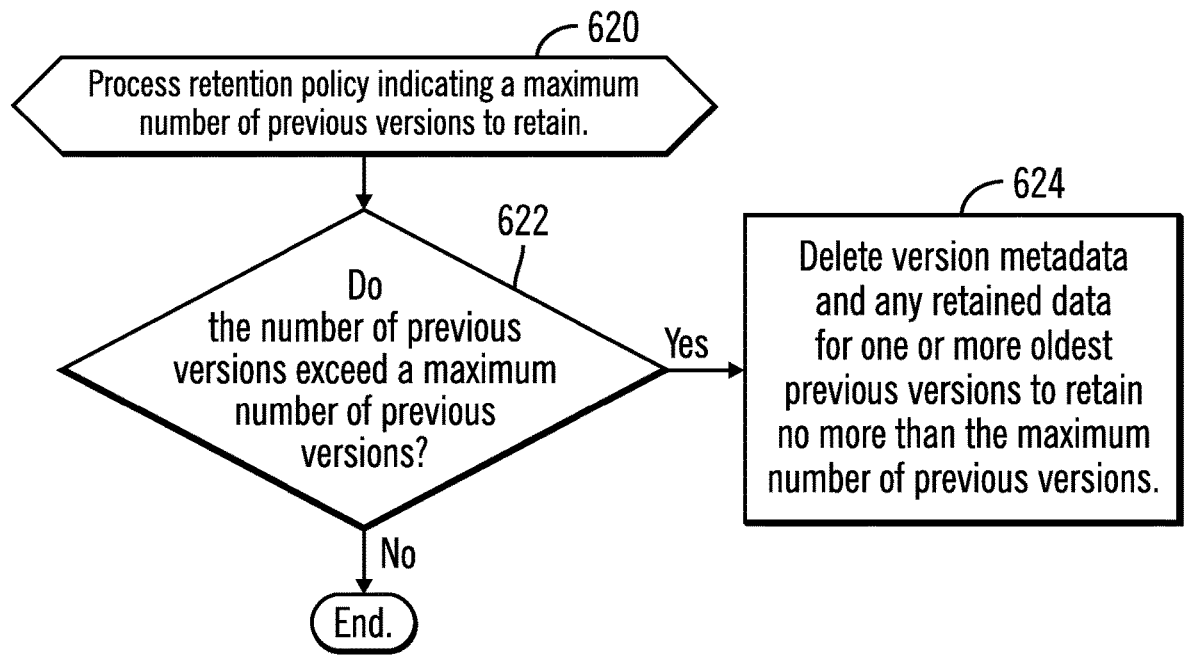

FIGS. 6*a*, 6*b*, and 6*c* illustrate embodiments of operations performed by the version manager 120 to apply the retention policies 208 for the assigned object serial number (VOLSER) for the object just appended. With respect to FIG. 6*a*, upon processing (at block 600) a retention policy indicating a maximum number of previous version objects to retain, a determination is made (at block 602) if a number of previous version objects $300_j$ for the serial number (VOLSER) exceed any maximum number of previous version objects to retain, not including the current version object $300_i$ having the appended data. If (at block 602) the maximum number of previous version objects is exceeded, then the version manager 120 deletes (at block 604) one or more oldest version objects to retain only the maximum number of previous version objects. The version metadata $400_j$ for the deleted one or more oldest versions is updated (at block 606) to indicate version location 410 having data for the deleted one or more oldest versions is included in the current version object $300_{i+1}$ and any remaining previous version objects having a higher version number than the oldest versions deleted.

With respect to FIG. 6*b*, upon processing (at block 610) a retention policy indicating a maximum number of days to retain previous versions, both version metadata and objects, a determination is made (at block 612) if any previous versions, as indicated in the created timestamp 408 of the version metadata $400_j$, have an age exceeding a maximum number of days. If (at block 612) there are previous versions having an age 408 exceeding the maximum number of days, then the version manager 12 deletes (at block 614) version metadata $400_j$ and any retained version objects $300_j$ for any previous versions having an age exceeding the maximum number of days.

With respect to FIG. 6*c*, upon processing (at block 620) a retention policy indicating a maximum number of previous versions to retain, both version metadata and objects, a determination is made (at block 622) whether the number of previous versions, for which version metadata or version objects are maintained, exceeds a maximum number of previous versions. If (at block 622) the maximum number of previous versions is exceeded, then the version manager 12 deletes (at block 624) version metadata $400_j$ and any retained version objects $300_j$ for one or more oldest previous versions to retain version metadata $400_j$ and any version objects $300_j$ for no more than the maximum number of previous versions.

FIG. 7*a* illustrates an example of version metadata for a logical volume L00000 over 7 days and provides a snapshot of how the version metadata would appear on a seventh day. In this example, the volume is being appended to once per day and the volume policy for version retention is set to 7 days and the policy for previous version object retention is to keep one previous version objects. Each time the volume is appended to creates a new version. On day 1, the initial version of L00000 is written (v1) with a size of 3.2 GB. On day two, 50 MB is appended to L00000 creating a new version the size of 3.25 GB. This triggers three events:
1) L00000 v1's 7-day version retention period starts on this day, day 2.
2) The actual data being stored for v1 can be deleted to free up storage space
3) A version offset value 414 is stored as part of the version metadata indicating where v1 of the current data ended and where v2 started.

On day 2, the object version $300_1$ is no longer needed because the version object $300_1$ data can be recovered from the current version object $300_2$ up through the end offset 414, where the region where v1 ended and where v2 started may be calculated by subtracting the offset value. In this case, the offset value is 50 MB since that is how much additional data was appended to the most current version of L00000, v2, which is 3.25 GB in size. Note that this "offset" could instead be tracked by a tape block identifier.

In FIG. 7*a*, following day 2, each day additional data is appended to L00000 as follows:
Day 3-100 MB is appended creating v3 with size 3.35 GB
Day 4-100 KB is appended creating v4 with size 3.3501 GB
Day 5-50 MB is appended creating v5 with size 3.4001 GB
Day 6-100 MB is appended creating v6 with size 3.5001 GB
Day 7-100 MB is appended creating v7 with size 3.6001 GB As with version v1, each day a new version is written the previous version's retention period will begin and that previous version's data is deleted leaving only the most current version. In this way, the version metadata 700 maintains information on where each version ends.

On day 7, if a problem occurs where an older version of the data must be restored, the most current version of the data can be used. The version manager 120 uses the version metadata 700 to find the point where the desired version ends by subtracting the version offsets and finding the ending tape mark in the data.

However, at some point the version retention period will be exceeded and the version metadata will be removed. In FIG. 7*a*, L00000 v1's version metadata 702 VMD will be deleted on day 10. This is because the version retention period started on day 2 as mentioned previously and the version retention period policy was set to 7 days. The version retention period must be exceeded so one more day is added. Only the version metadata 702 for version1 is deleted since no actual data was saved for version v1.

In the example of FIG. 7*a*, substantial space saving is realized since only one of the 7 versions of data needs to be kept. If all 7 versions of this one volume needed to be kept it would consume over 23 GB of space instead of only 3.6 GB. Described embodiments provide the ability to restore from any version while only keeping one version of the data and that can be the most recent version of the data, which is kept anyway. This means no additional storage space is even required to recover a previous version.

FIG. 7*b* provides an example of the application of the retention policy to maintain three version objects for previous versions in the case of data corruption, malicious activity or unrecoverable disk system failures. For instance, the retention policy may specify to retain the last three incremental versions. The number of versions kept is not necessarily important to the recovery process but serves as backups in case the most recent version cannot be accessed.

In FIG. 7*b*, the user specifies to not only retain version metadata for seven days but also retain the most recent three previous version objects $300_p$ of data, not including the current version object 300*c*. The version manager 120 may restore a previous version object from any of the saved previous version objects $300_P$.

With respect to FIG. 7*b*, upon restoring L00000 v3 from the v4 data, the offset would be the −100 KB. But, if using v7 to restore v3, the offset value is −250.1 MB since the additional appended amount of data between v3 and v7 is 250.1 MB.

If, on day 8, another append is issued and a version 8 of the data is written, previous version 4 version object $300_4$ will be deleted in accordance with the retention policy to only retain 3 data versions.

FIG. 7*c* is an example of the pattern continuing where data is appended to L00000 once per day, version 10 will be created and data versions 7, 8 and 9 will be retained in storage along with the most recent object version $300_{10}$ for v10. Also, on day 10 the version metadata $300_1$ for version v1 will be deleted due to the 7-day version retention period being exceeded.

Figure 8:
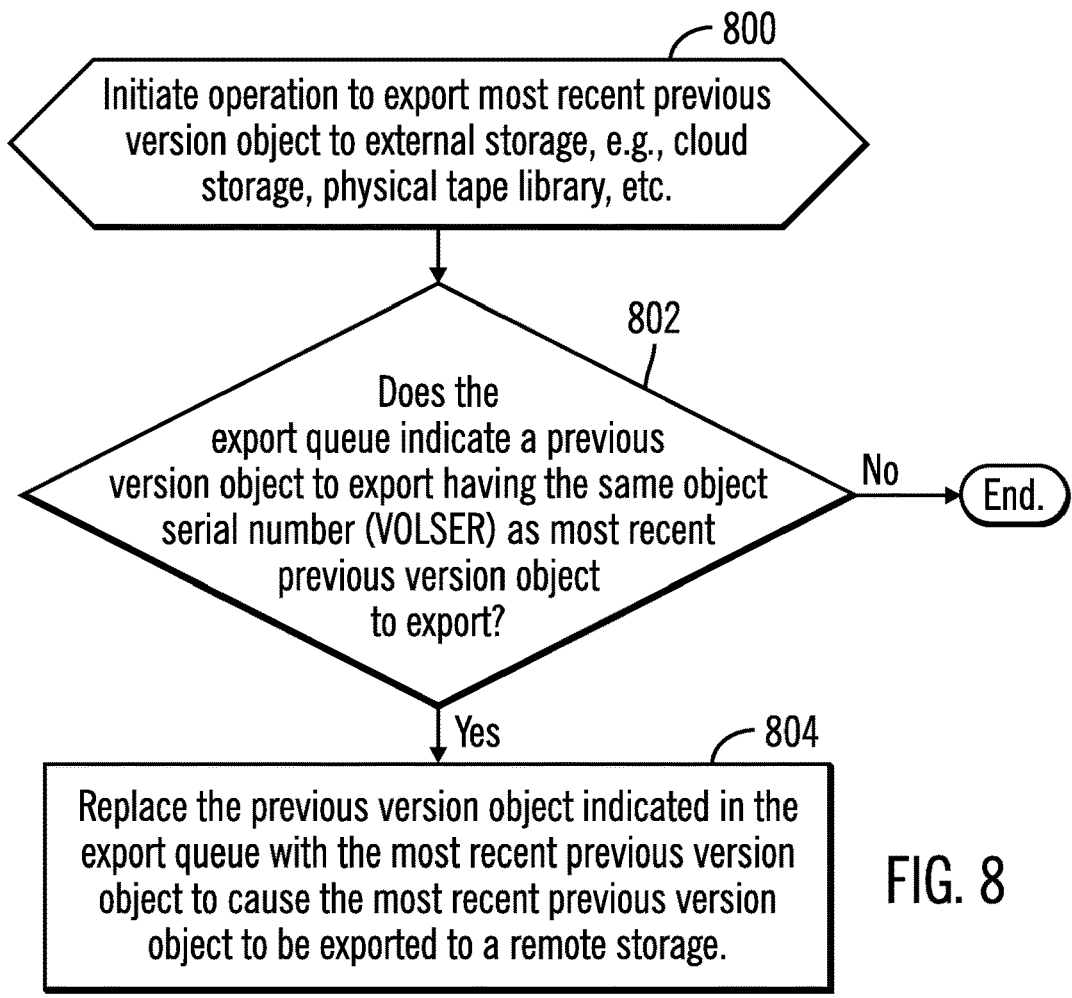
FIG. 8 illustrates an embodiment of operations to export a most recent previous version object to a remote storage.

FIG. 8 illustrates an embodiment of operations performed by the version manager 120 to export previous version objects 300*p* to a physical tape library 110 or cloud storage 106. Upon initiating (at block 800) an operation to export a most previous version object $300_i$ to external storage, e.g., cloud storage 106 or physical tape library 110, if (at block 802) the export queue 124 indicates a previous version object to export having the same object serial number (VOLSER) as most recent previous version object $300_i$, then the version manager 120 replaces (at block 804) the previous version object $300_k$ indicated in the export queue with the most recent previous version object $300_i$ to cause the most recent previous version object 300*k* to be exported to remote storage 110, 106.

Figure 9:
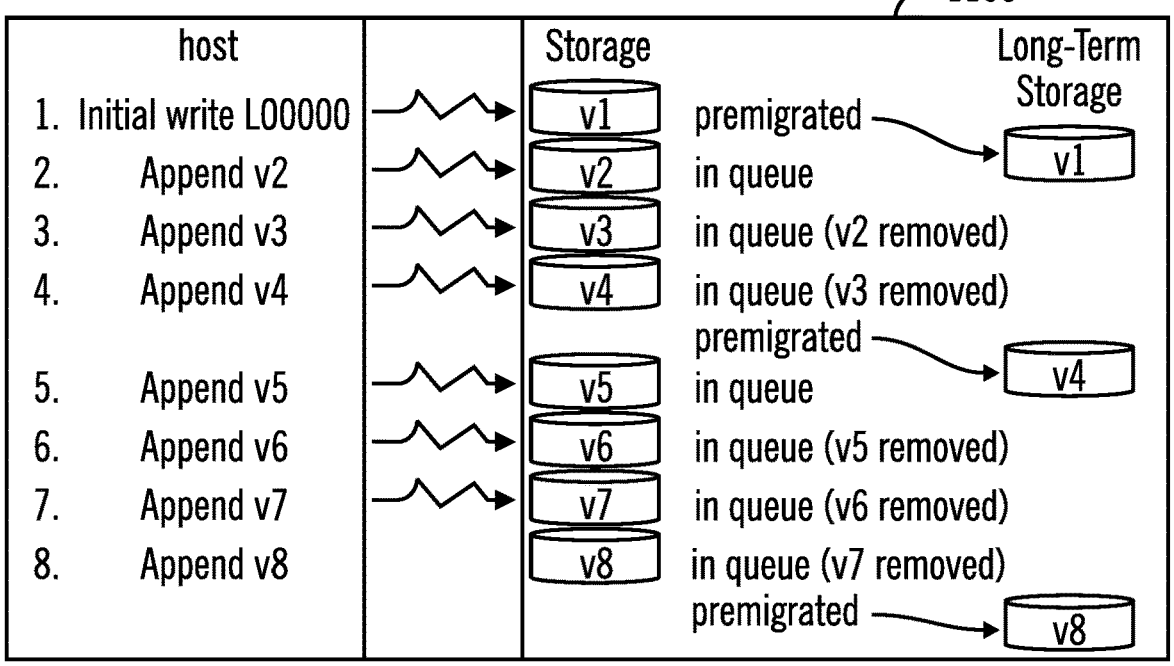
FIG. 9 illustrates an example of how version objects are exported to storage according to FIG. 8.

FIG. 9 illustrates an example to store these version objects by exporting them to a lower cost, long-term device such as a physical tape library 110 or a cloud storage 106.

This use case describes limiting the placement of only one version object on the export queue 124 for a VOLSER to limit excessive version objects being added to the queue 124. In FIG. 9, VOLSER L00000 is expected to be copied/exported to a long-term storage device such as a cloud object store 106 or a physical tape library. To do this, an export task for L00000 will be put into the export queue 124. The export of L00000 will be processed when it reaches the top of the export queue 124. In this example, v1 (version 1) is initially written and has already completed its export to a cloud object store in step 1.

Step 2 in FIG. 9 shows data is appended to the volume. This creates a version 2 (v2) of the data. The storage device will keep version metadata $400_2$ for the appended version object $300_2$ plus preserve the version metadata $400_1$ for the original v1 as discussed in previous use case scenarios. A copy of this second version of L00000 must be exported to the remote storage 106, 110. That export task is put in the export queue 124, but before it reaches the top of the queue 124 another append operation at step 3 for version 3 (v3) takes place. The version metadata $400_3$ for v3 is created. Since L00000 v2 is still queued to be copied to the remote storage 106, 110, the version manager 120 replaces v2 in the export queue 124 with v3 to export version object $300_3$ for version 3. The version metadata $300_2$ and $300_3$ for both v2 and v3, respectively, is retained.

Subsequently, another append occurs to L00000 to record version metadata $400_4$ for version 4 (v4) as well as the version metadata $400_3$ for v3. Once again, the previous version (v3) has not yet made it to the top of the queue 124 so it is replaced with v4 in the queue 124. L00000 maintains its place in the queue so a version object is exported.

Continuing with the example in FIG. 9, L00000 v4 finally makes it to the top of the queue 124 and is processed. FIG. 9 goes on to show four more appends for versions 5, 6, 7 and 8 of L00000 but only version 8 (v8) is copied to the remote storage 106, 110. Now, the remote storage 106, 110 has three actual copies of the version objects $300_1$, $300_4$, $300_8$ (v1, v4, v8) and version metadata for all versions (v1 through v7).

V1 and v4 may be deleted from cloud storage 106 because any version of the data can be retrieved from v8. However, keeping more than one version is desirable in case of data corruption as mentioned previously.

The embodiments of FIGS. 8 and 9 provide flexibility in retaining version objects for multiple previous versions. Data appends can be in the hundreds in a few hours for a single volume. If appends are coming in rapidly for a VOLSER, the version manager 120 will not be overwhelmed trying to export all the incremental copies of the data. Each VOLSER has only one entry in the queue 124 and the version for the queued data will change if an influx of append writes occur in a short period of time, but only the version metadata is saved for each version providing the ability to recover at any point without having to store every data version.

This queue method can also be used with x days to retain version, n number of data versions to keep or a combination of both. If a user sets the version retention value to 7 days, the version metadata and the older version of data if retained will be deleted as that retention period is exceeded just like in the previous scenarios.

The next section discusses data appends when a separate, long-term storage device such as a physical tape library or cloud object store is not available, and versions of data need to be stored on the primary disk system. The use case also introduced a third space saving option; to 'keep every y data version'. This option could be used in any of the other append use cases above and would work particularly well in cases where there could be an extremely large number of versions.

FIGS. 10a and 10b provide an example when a separate, remote storage, such as a physical tape library 110 or cloud store 106, is not available, and version objects need to be stored on the primary disk system 112. The storage of version objects may be limited by the retention policy to "keep every yth version object". This retention policy may be used in any of the other append use cases above and is particularly useful for use cases where there could be an extremely large number of versions.

In this scenario, the user sets the version retention value to 7 days. This means that the version manager 120 retains an older version of a volume for at least 7 days once a newer version is created. The user also sets a retention policy to only retain every 3rd version object of the data.

With respect to FIG. 10a, on day 1, L00000 is written for the first time as v1 and version metadata $400_1$ is recorded. On day 2 in FIG. 13, L00000 v2 append occurs and its version metadata $400_2$ is recorded. When v2 is created, v1 becomes the older version and its version metadata $400_1$ is recorded. Since v1 was the first version created, it will be retained for 7 days based on the version retention property setting. V2 is retained as the most recent version.

At step 3 in FIG. 10a, L00000 v3 append occurs and is now the most recent version of data. V3 version metadata $400_3$ is recorded. V2 becomes an older version and its version metadata $400_2$ is recorded. The version object $300_2$ for v2 is not retained because it is not the first version nor is it the third version since v1. At this point, only the version objects $300_1$ and $300_3$ for versions v1 and v3, respectively, are retained because v1 has not exceeded the version retention period and v3 is the most recent version. However, the version metadata $400_2$ is retained for v2 and the version object $300_2$ for v2 can be recovered from v3's version object $300_3$.

At day 4 in FIG. 10a, L00000 v4 append occurs and is now the most recent version of data. V4's version metadata $400_4$ is recorded. V3 now becomes an older version with its version metadata $400_3$ recorded. However, because v3 is not the first version v1 nor the third version since v1, it is not eligible to be retained, so the version object $300_3$ for v3 is deleted. At this point, only v1 and v4 data exists, v1 has not exceeded the version retention period and v4 is the most recent version.

At day 5 in FIG. 10a, L00000 v5 append occurs and is now the most recent version of data. V5's version metadata $400_5$ is recorded. V4 now becomes an older version and its version metadata $400_4$ is retained. Since V4 is third version from the first version (v1), its version object $300_4$ is retained. At this point, version objects $300_1$, $300_4$, and $300_5$ for versions v1, v4 and v5, respectively, are retained. V1 and v4 version objects $300_1$ and $300_4$ continue to be retained because they have not exceeded the version retention period and version object $300_5$ for v5 is retained because v5 it is the most recent version.

At day 6 in FIG. 10a, L00000 v6 append occurs and is now the most recent version of data. V6's version metadata $400_6$ is recorded. V5 becomes an older version and its version metadata $400_5$ is retained. Since v5 is not the third version since v4, version object $300_5$ for v5 is not eligible to be retained so version object $300_5$ is deleted. The version objects $300_1$ and $300_4$ for v1 and v4, respectively, continue to be retained because they have not exceeded the version retention period and the version object $300_6$ for v6 is retained because it is the most recent version. If the version object $300_5$ for v5 needs to be recovered, then the version object $300_6$ for v6 can be used up to the v5 level using the version metadata $400_5$ information for v5.

At day 7 in FIG. 10a, L00000 v7 append occurs and is now the most recent version of data. Version metadata $400_7$ for V7 is recorded. V6 becomes an older version and its version metadata $400_6$ is retained. Since v6 is not the third version since v4, version object $300_6$ is not eligible to retain so version object $300_6$ is deleted. The version objects $300_1$ and $300_4$ continue to be held because they have not exceeded the version retention period and object version $300_7$ for v7 data is kept because it is the most recent version.

At day 8 in FIG. 10a, L00000 v8 append occurs and is now the most recent version of data. Version metadata $400_8$ for V8 is recorded. V7 becomes an older version and its version metadata $400_7$ is retained. Since v7 is the third version since v4, the version object $300_7$ for v7 will be retained. Version objects $300_1$, $300_4$, and $300_7$ for v1, v4 and v7, respectively, continue to be retained because they have not exceeded the version retention period and version object $300_8$ for v8 is retained because it is the most recent version.

At day 9 in FIG. 10a, v1 is eligible to be deleted and its version object $300_1$ and version metadata $400_1$ are both deleted. At this point version objects for $300_1$, $300_4$, and $300_8$ are the only versions where real data is retained. Also, on day 9, any version object of L00000 from v2 to v8 can be restored even though actual data for those versions do not exist.

With respect to FIG. 10b, which is an extension of FIG. 10a, version objects $300_2$ and $300_3$ for v2 and v3, respectively, can be restored using the actual data stored in version objects $300_4$, $300_7$ or $300_8$ for versions v4, v7 or v8, respectively, using the version metadata information to determine where the version ends on the tape (depicted by the Version Offset value, referred to as end offset 414 in FIG. 4). Likewise, version objects $300_5$ and $300_6$ for versions v5 and v6, respectively, can be restored using version object $300_7$ or $300_8$ for versions v7 or v8, respectively. When v2 exceeds its version retention period on day 9, only the version metadata $400_9$ for v9 needs to be deleted since the version object $300_2$ for v2 was not retained.

In this way, the examples of FIGS. 10a and 10b show how setting a retention policy to retain data in intervals can reduce the number of data versions that are kept in a controlled manner compared to the queuing use case. There is also a potential use case of keeping all versions of data forever. This could be for legal reasons such as legal holds or for audit purposes.

Policy Pools

As discussed, the version manager 120 may maintain policy pools 200 that indicate object serial numbers (VOL-SERs) assigned to policy pools providing different retention policies for objects in the policy pools. The policy pools 200 provide retention policies to support interactions with a tape library 110, cloud storage 106 and primary storage 112.

Using a cloud object store 106 as an example, the volume version retention policies described in the examples above can be set when configuring a cloud policy pool 200. Tape volumes assigned to a cloud policy pool 200 may be managed according to these policies. Each time a VOLSER is selected from the common scratch pool 122, that VOLSER is assigned to a policy pool 200$k$. Those policies can be different each time that a serial number (VOLSER) is reused.

In this embodiment, the full version objects 300 of data are retained and reusable and each contain unique content. The version objects 300 may be retained for some duration of time for point-in-time recovery. The version manager 120 may store at a minimum the latest object version 300 and at least one previous version with the ability to restore such previous version or versions. Different retention rules may comprise, as described above:

retain every Nth version.
retain object versions 300 in an external store 106, 110, 112.
revision manager 120 applies a policy management configured at the time of re-use to determine a version object retention criteria.
the retention rules, versions etc. can be dynamically changed retroactively.

When a version object $300_i$ serial number, e.g., VOLSER, is returned to scratch (deleted), it goes into a common scratch pool 122. Serial numbers or VOLSERs in the common scratch pool 122 can be assigned to different host 100 job types, each with differing requirements depending on their use of the VOLSER. Management policies for a VOLSER can change every time a volume is selected from the scratch pool 122. This means that L00000 v1 might have a policy to retain its version for 7 days but when version 1 (v1) is deleted by the host 100, has exceeded its category retention and is placed back into the common scratch pool 122, the next time the object is written to, the VOLSER may be assigned from the scratch pool 1122 to a different policy pool $200_i$ so L00000 v2 could have a version retention that indicates to keep that version forever.

When L00000 v2 is deleted, has exceeded its category retention and is picked up as scratch, L00000 v3 could have a seven-day version retention in a different policy pool $200_j$ that further specifies to retain only the last four versions.

Assigning VOLSERs to different policy pools for writing each version allows the flexibility to handle the various version retention policies that a VOLSER might be set to. FIG. 11 shows a list of four cloud pools and different retention policies, such as version retention days, e.g., 3, 0, 30, forever, and a maxim number of versions to keep. Only cloud pool 3 in FIG. 11 provides a maximum limit on the number of versions to keep.

FIG. 12 shows a timeline of VOLSER L99999 as it is selected from the common scratch pool 122 and reused with different cloud pool policies over time. To accelerate the timeline, the volume is written, deleted, has no category retention and is picked up from the common scratch pool 122 each day:

This example shows a view of a lifespan of a VOLSER where a VOLSER can be picked up from a common scratch pool 122 and used with any combination of policies on a storage system.

FIG. 12 illustrates an example of how the version objects 300 of actual data are created and retained according to the cloud pool policies of FIG. 11. With respect to FIG. 12:

On Day 1, VOLSER L99999 v1 is assigned to CLDPOOL1. CLDPOOL1's properties have a 3-day version retention with no maximum number of versions to keep.

Day 2, the VOLSER is picked up from the common scratch pool 122 to be reused and is assigned CLDPOOL1 again. L99999 v2 is created. V1 is now the older version object $300_1$ and starts its version retention period.

Day 3, the VOLSER is picked up from the common scratch pool 122 to be reused and is assigned CLDPOOL4. CLDPOOL4's properties are set to keep versions forever. L99999 v3 is created. V2 is now the older version object $300_{20}$ and starts its version retention period.

Day 4, the VOLSER is picked up from the common scratch pool 122 to be reused and is assigned CLDPOOL3. CLDPOOL3's properties have a 30-day version retention with a maximum number of versions to keep of 3. L99999 v4 is created. V3 is now the older version object $300_3$ and starts its version retention period. Since it carries the properties of CLDPOOL4, it is set to never be deleted.

Day 5, the VOLSER is picked up from the common scratch pool 122 to be reused and is assigned CLDPOOL1. L99999 v5 is created. V4 is now the older version object $300_4$ of data and starts its version retention period.

Day 6, the VOLSER is picked up from the common scratch pool 122 to be reused and is assigned CLDPOOL2. L99999 v6 is created. V5 is now the older version object $300_5$ of data and starts its version retention period.

Day 7, the VOLSER is picked up from the common scratch pool 122 to be reused and is assigned CLDPOOL4. L99999 v7 is created. V6 is now the older version object $300_6$ of data. Since version object $300_6$ (v6) carries the properties of CLDPOOL2, which has no version retention period, it is immediately deleted.

Day 8, the VOLSER is picked up from the common scratch pool 122 to be reused and is assigned CLDPOOL1. L99999 v8 is created. V7 is now the older version object $300_7$ of data and starts its version retention period. Since it carries the properties of CLDPOOL4, it is set to never be deleted.

Day 9, the VOLSER is picked up from the common scratch pool 122 to be reused and is assigned CLDPOOL3. L99999 v9 is created. V8 is now the older version object $300_8$ of data and starts its version retention period.

Day 10, the VOLSER is picked up from the common scratch pool 122 to be reused and is assigned CLDPOOL3. L99999 v10 is created. V9 is now the older version object 3009 of data and starts its version retention period.

Day 11, the VOLSER is picked up from the common scratch pool 122 to be reused and is assigned CLDPOOL3. L99999 v11 is created. V10 is now the older version object $300_{10}$ of data and starts its version retention period.

Day 12, the VOLSER is picked up from the common scratch pool 122 to be reused and is assigned CLDPOOL3. L99999 v12 is created. V11 is now the older version object $300_{11}$ of data and starts its version retention period. Also on this day, v4 will be prematurely deleted because the max_versions_to_keep is exceed for a single VOLSER of 3 and we now have four (v4, v9, v10 and v11). V12 is also assigned CLDPOOL3 but it is the most current active data and is not counted.

FIG. 13 provides a view of what is stored on day five. On day 5, CLDPOOL1 has two older version objects $300_6$ and $300_7$ of L99999 that have not yet exceeded their version retention period and also version object $300_5$ (v5), which is the current active data volume on day 5. CLDPOOL3 also has an older version object $300_4$ of L99999, which is not scheduled to expire until day 36. Last, CLDPOOL4 has one version object $300_3$ of L99999, which will never expire.

FIG. 14 provides a view of what is stored on day 12. On day 12, CLDPOOL1 now has only one older object version $300_8$ of L99999. All other versions in CLDPOOL1 have exceeded their version retention period. CLDPOOL2 is empty (no versions kept). This is expected since CLDPOOL2 has no versioning set. Next, CLDPOOL3 has four older versions of L99999 and the most current version (v12). CLDPOOL3 has exceeded its max_versions_to_keep of 3 so the older version object $300_4$ (v4) must be deleted. Max_versions_to_keep will supersede the version_retention_day setting. This will help control the number of versions that are allowed to be kept for any one volume. Other settings can also be added such as maximum number of versions to be kept per day, for instance. Last, CLDPOOL4 has two version objects $300_3$ and $300_7$ of L99999 that are set to be kept forever. These volumes will not be deleted unless the policy of CLDPOOL4 is modified.

The policy pool 200 settings can be modified by an authorized user and the settings change is retroactive. So, if CLDPOOL4 is modified on Day 13 to version_retention_day=7, L99999 version object $300_3$ (v3) will be immediately eligible to be deleted and version object $300_7$ (v7) will be eligible to delete on day 16.

Note on FIG. 13 that v3's version retention period still started on day 4 even though it had an infinite expiration value. This start date is still valid if the cloud pool, in this case CLDPOOL4, has its properties changed. So, when CLDPOOL4's version_retention_day changed from 'forever' to 7 days, version object $300_3$ (v3) became eligible for deletion on day 12. Likewise, L99999 v7's new version eligibility date is change from infinite to day 16.

Provided are examples of implementations of the policy pool embodiments.

Example 1 is a computer program product for retaining versions of an object, wherein the computer program product comprises a computer readable storage medium having program instructions executable by a processor to cause operations, the operations comprising: assigning a serial number for a first object to a first policy pool of a plurality of policy pools, wherein the policy pools indicate different retention policies for versions of objects assigned to the policy pools, wherein the first policy pool has a first retention policy, and wherein each version of the first object has a same serial number; determining whether the first retention policy indicates to not retain one of the versions of the first object; deleting one of the versions of the first object in response to determining that the first retention policy indicates to not retain one of the versions of the object; returning the serial number for the deleted version of the first object to a common scratch pool; and assigning the serial number in the common scratch pool to a second policy pool, having a second retention policy, for a job to use write data to versions of a second object having the serial number, wherein the first and the second retention policies provide different rules for retaining versions of an object.

In Example 2, the subject matter of examples 1 and 3-9 can optionally include that at least one previous version of the first object remains in the first policy pool while versions of the second object having the serial number are created in the second policy pool.

In Example 3, the subject matter of examples 1, 2 and 4-9 can optionally include that the first and the second objects comprise first and second volumes, wherein the serial number comprises a volume serial number used to uniquely identify a tape volume, wherein the volume serial number is used to identify versions of the first and the second volumes assigned to the first and the second policy pools.

In Example 4, the subject matter of examples 1-3 and 5-9 can optionally include that each version of the first and the second objects includes a full copy of data for the version.

In Example 5, the subject matter of examples 1-4 and 6-9 can optionally include that the determining whether the first retention policy indicates to not retain one of the versions of the first object is performed in response to writing data to create a next version of the first object.

In Example 6, the subject matter of examples 1-5 and 7-9 can optionally include that the first and the second retention policies indicate a condition under which to remove an oldest previous version of the object, wherein the oldest previous version of the first object is deleted in response to determining the condition indicates to remove the oldest previous version.

In Example 7, the subject matter of examples 1-6, 8, and 9 can optionally include that the condition indicates to remove at least one of (1) any previous versions that exceed a specified number of days since created and (2) an oldest previous version to not retain more than a maximum number of versions.

In Example 8, the subject matter of examples 1-7 and 9 can optionally include that the first retention policy indicates a maximum number of versions to retain, wherein the determining whether the first retention policy indicates to not retain one of the versions of the first object further comprises determining whether a number of previous versions of the first object exceeds the maximum number of versions to retain, and wherein the deleting one of the versions of the first object comprises deleting an oldest previous version of the first object in response to determining that the number of previous versions of the first object exceeds the maximum number of versions to retain.

In Example 9, the subject matter of examples 1-8 can optionally include that different numbers of versions of objects having the serial number are maintained in the policy pools due to different retention policies for the policy pools.

Example 10 comprises a system including a processor that executes program instructions in a computer readable storage medium to perform the operations as described in Examples 1 through 9.

Example 11 comprises a method to perform operations as described in Examples 1 through 9.

The described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 15:
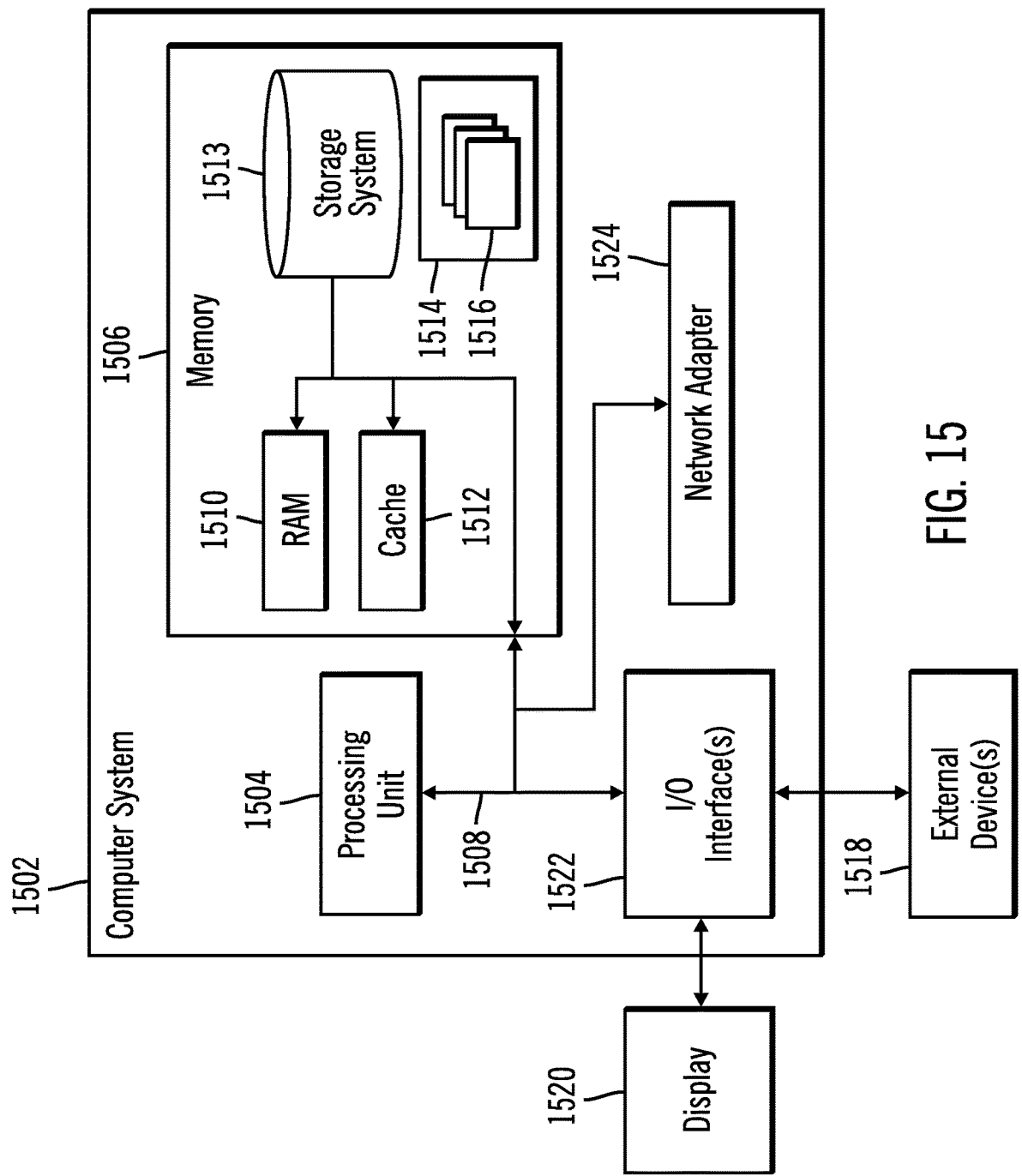
FIG. 15 illustrates a computing environment in which the components of FIG. 1 may be implemented.

The computational components of FIG. 1, including the hosts/storage controller 100, storage server 104, tape library 110, cloud storage 106, and primary storage 112 may be implemented in one or more computer systems, such as the computer system 1502 shown in FIG. 15. Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, the computer system/server 1502 is shown in the form of a general-purpose computing device. The components of computer system/server 1502 may include, but are not limited to, one or more processors or processing units 1504, a system memory 1506, and a bus 1508 that couples various system components including system memory 1506 to processor 1504. Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of embodiments of the invention.

Program/utility 1514, having a set (at least one) of program modules 1516, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. The components of the computer 1502 may be implemented as program modules 1516 which generally carry out the functions and/or methodologies of embodiments of the invention as described herein. The systems of FIG. 1 may be implemented in one or more computer systems 1502, where if they are implemented in multiple computer systems 1502, then the computer systems may communicate over a network.

Computer system/server 1502 may also communicate with one or more external devices 1518 such as a keyboard, a pointing device, a display 1520, etc.; one or more devices that enable a user to interact with computer system/server 1502; and/or any devices (e.g., network card, modem, etc.) that enable computer system/server 1502 to communicate with one or more other computing devices. Such communication can occur via Input/Output (I/O) interfaces 1522. Still yet, computer system/server 1502 can communicate with one or more networks such as a local area network (LAN), a general wide area network (WAN), and/or a public network (e.g., the Internet) via network adapter 1524. As depicted, network adapter 1524 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for retaining versions of an object, wherein the computer program product comprises a computer readable storage medium having program instructions executable by a processor to cause operations, the operations comprising:

maintaining a current version object including version object data for versions of the object up to a current version number and previous version object including version object data for versions of the object up through a previous version number prior to the current version number, wherein the current version object includes the version object data in the previous version object;

updating version metadata for the previous version object to indicate an offset in the current version object from which the previous version object can be recovered;

deleting the previous version object; and recovering the deleted previous version object from the offset in the current version object, indicated in the version metadata for the deleted previous version object.

2. The computer program product of claim 1, wherein the operations further comprise:

applying a retention policy to determine a condition under which to remove an oldest previous version object of previous version objects;

deleting version metadata for the oldest previous version object in response to determining that the condition indicates to remove the oldest previous version object; and deleting the oldest previous version object in response to determining that the condition indicates to remove the oldest previous version object and the oldest previous version object is retained.

3. The computer program product of claim 2, wherein the condition indicates at least one of to remove any previous version objects that exceed a maximum number of days since created and to remove the oldest previous version object to not retain more than a maximum number of previous versions.

4. The computer program product of claim 2, wherein the retention policy is applied in response to creating the current version object.

5. The computer program product of claim 1, wherein the operations further comprise:

determining whether to retain the previous version object in response to creating the current version object, wherein the previous version object is deleted in response to determining to not retain the previous version object, and wherein the version metadata for the previous version object is retained until a retention policy indicates to remove the previous version object.

6. The computer program product of claim 5, wherein the retention policy indicates to retain a previous version object for every ith version object, wherein the determining to retain the previous version object comprises determining that the previous version object comprises an ith version from a further previous version for which the previous version object is retained.

7. The computer program product of claim 5, wherein the retention policy indicates to maintain a maximum number of previous version objects, wherein the operations further comprise:

deleting an oldest previous version object in response to determining that a number of previous version objects exceeds the maximum number of previous version objects after determined to retain the previous version object.

8. The computer program product of claim 1, wherein the operations further comprise:

in response to appending changes to the previous version object resulting in the current version object, determining whether an export queue indicates a further previous version object; and replacing the further previous version object indicated in the export queue with the previous version object to cause the previous version object to be exported to a remote storage.

9. The computer program product of claim 1, wherein the previous version object, before appending changes to produce the current version object, includes trailing metadata at an end of the previous version object added by a system that provided data for the previous version object, wherein the operations further comprise:

marking the trailing metadata in the previous version object as hidden, wherein the appending changes comprises appending changes after the marking the trailing metadata as hidden to retain the hidden trailing metadata in the previous version object to use to recover the previous version object.

10. A computer program product for retaining versions of an object, wherein the computer program product comprises a computer readable storage medium having program instructions executable by a processor to cause operations, the operations comprising:

appending changes to a previous version object resulting in a current version object, wherein the current version object includes version object data for versions of the object up to a current version number and the previous version object including version object data for versions of the object up through a previous version number prior to the current version number, wherein the current version object includes the version object data in the previous version object;

updating version metadata for the previous version object to indicate an offset in the current version object at which the previous version object is located in current version object and including trailing metadata at an end of the previous version object before the changes were appended to the previous version object to create the current version object;

deleting the previous version object after the appending changes to the previous version object; and retaining the version metadata for the previous version object after the previous version object is deleted, wherein the offset and the trailing metadata in the version metadata are used to recover the previous version object from the current version object with the trailing metadata restored in the recovered previous version object.

11. The computer program product of claim 10, wherein the appending changes overwrites the trailing metadata at the end of the previous version object resulting in removal of at least a portion of the trailing metadata, for the previous version object, in the current version object.

12. The computer program product of claim 10, wherein the trailing metadata was added by a host system that provided the previous version object and changes to append to the previous version object and includes information on the host system.

13. A system for retaining versions of an object, comprising:
- a processor; and
- a computer readable storage medium having program instructions that when executed by the processor cause operations, the operations comprising:
  - maintaining a current version object including version object data for versions of the object up to a current version number and previous version object including version object data for versions of the object up through a previous version number prior to the current version number, wherein the current version object includes the version object data in the previous version object;
  - updating version metadata for the previous version object to indicate an offset in the current version object from which the previous version object can be recovered;
  - deleting the previous version object; and
  - recovering the deleted previous version object from the offset in the current version object, indicated in the version metadata for the deleted previous version object.

14. The system of claim 13, wherein the operations further comprise:
- applying a retention policy to determine a condition under which to remove an oldest previous version object of previous version objects;
- deleting version metadata for the oldest previous version object in response to determining that the condition indicates to remove the oldest previous version object; and
- deleting the oldest previous version object in response to determining that the condition indicates to remove the oldest previous version object and the oldest previous version object is retained.

15. The system of claim 13, wherein the operations further comprise:
- determining whether to retain the previous version object in response to creating the current version object, wherein the previous version object is deleted in response to determining to not retain the previous version object, and wherein the version metadata for the previous version object is retained until a retention policy indicates to remove the previous version object.

16. The system of claim 15, wherein the retention policy indicates to maintain a maximum number of previous version objects, wherein the operations further comprise:
- deleting an oldest previous version object in response to determining that a number of previous version objects exceeds the maximum number of previous version objects after determined to retain the previous version object.

17. The system of claim 13, wherein the operations further comprise:
- in response to appending changes to the previous version object resulting in the current version object, determining whether an export queue indicates a further previous version object; and
- replacing the further previous version object indicated in the export queue with the previous version object to cause the previous version object to be exported to a remote storage.

18. The system of claim 13, wherein the previous version object, before appending changes to produce the current version object, includes trailing metadata at an end of the previous version object added by a system that provided data for the previous version object, wherein the operations further comprise:
- marking the trailing metadata in the previous version object as hidden, wherein the appending changes comprises appending changes after the trailing metadata is hidden to retain the hidden trailing metadata in the previous version object to use to recover the previous version object.

19. A system for retaining versions of an object, comprising:
- a processor; and
- a computer readable storage medium having program instructions that when executed by the processor cause operations, the operations comprising:
  - appending changes to a previous version object resulting in a current version object, wherein the current version object includes version object data for versions of the object up to a current version number and the previous version object including version object data for versions of the object up through a previous version number prior to the current version number, wherein the current version object includes the version object data in the previous version object;
  - updating version metadata for the previous version object to indicate an offset in the current version object at which the previous version object is located in the current version object and including trailing metadata at an end of the previous version object before the changes were appended to the previous version object to create the current version object;
  - deleting the previous version object after the appending changes to the previous version object; and
  - retaining the version metadata for the previous version object after the previous version object is deleted, wherein the offset and the trailing metadata in the version metadata are used to recover the previous version object from the current version object with the trailing metadata restored in the recovered previous version object.

20. The system of claim 19, wherein the trailing metadata was added by a host system that provided the previous version object and changes to append to the previous version object and includes information on the host system.

21. A method for retaining versions of an object, comprising:
- maintaining a current version object including version object data for versions of the object up to a current version number and previous version object including version object data for versions of the object up through a previous version number prior to the current version number, wherein the current version object includes the version object data in the previous version object;
- updating version metadata for the previous version object indicating an offset in the current version object from which the previous version object can be recovered;
- deleting the previous version object; and
- recovering the deleted previous version object from the offset in the current version object, indicated in the version metadata for the deleted previous version object.

22. The method of claim 21, further comprising:
applying a retention policy to determine a condition under which to remove an oldest previous version object of previous version objects;
deleting version metadata for the oldest previous version object in response to determining that the condition indicates to remove the oldest previous version object; and
deleting an oldest previous version object in response to determining that the condition indicates to remove the oldest previous version object and the oldest previous version object is retained for the oldest previous version object.

23. The method of claim 21, further comprising:
determining whether to retain the previous version object in response to creating the current version object, wherein the previous version object is deleted in response to determining to not retain the previous version object, and wherein the version metadata for the previous version object is retained until a retention policy indicates to remove the previous version object.

24. The method of claim 21, further comprising:
in response to appending changes to the previous version object resulting in the current version object, determining whether an export queue indicates a further previous version object; and
replacing the further previous version object indicated in the export queue with the previous version object to cause the previous version object to be exported to a remote storage.

25. The method of claim 21, wherein the previous version object, before appending changes to produce the current version object, includes trailing metadata at an end of the previous version object added by a system that provided data for the previous version object, further comprising:
marking the trailing metadata in the previous version object as hidden, wherein the appending changes comprises appending the changes after the trailing metadata is hidden to retain the hidden trailing metadata in the previous version object to use to recover the previous version object.

* * * * *